United States Patent [19]

Johnson et al.

[11] Patent Number: 4,968,652
[45] Date of Patent: Nov. 6, 1990

[54] PILLARED LAYERED SILICATE COMPOSITIONS CONTAINING PILLARS OF SILICA AND METAL OXIDE AND THEIR PREPARATION

[75] Inventors: Ivy D. Johnson, Medford; Pochen Chu, West Deptford, both of N.J.

[73] Assignee: Mobil Oil Corporation, New York, N.Y.

[21] Appl. No.: 494,910

[22] Filed: Mar. 9, 1990

Related U.S. Application Data

[63] Continuation of Ser. No. 195,057, May 17, 1988, abandoned, which is a continuation-in-part of Ser. No. 939,265, Dec. 9, 1986, Pat. No. 4,791,088, which is a continuation of Ser. No. 797,276, Nov. 12, 1985, abandoned.

[51] Int. Cl.$^5$ .................. B01J 20/12; B01J 21/16
[52] U.S. Cl. ..................... 502/63; 423/277; 423/328; 502/84
[58] Field of Search ............... 502/63, 84, 232, 240; 423/277, 306, 331, 332, 326, 327, 328, 328 M, 328 Z, 328 T

[56] References Cited

U.S. PATENT DOCUMENTS

| | | | |
|---|---|---|---|
| 4,248,739 | 2/1981 | Vaughan et al. | 502/63 |
| 4,600,503 | 7/1986 | Angevine et al. | 208/251 H |
| 4,629,713 | 12/1986 | Suzuki et al. | 502/84 |
| 4,650,779 | 3/1987 | Goldstein | 502/38 |
| 4,666,877 | 5/1987 | Vaughan | 502/84 |
| 4,719,191 | 1/1988 | Battiste et al. | 502/84 |
| 4,791,088 | 12/1988 | Chu et al. | 502/232 |
| 4,812,222 | 3/1989 | Kicker et al. | 502/84 |
| 4,861,917 | 8/1989 | Matsumoto et al. | 568/347 |

FOREIGN PATENT DOCUMENTS 00091  1/1988  PCT Int'l Appl. .................. 502/63

OTHER PUBLICATIONS

Bailar, Jr. et al., comprehensive Inorganic Chemistry Pergamon Press. 1973, vol. 1, pp. 1013, 1020, 1052.

*Primary Examiner*—Jeffrey E. Russel
*Attorney, Agent, or Firm*—Alexander J. McKillop; Charles J. Speciale; Laurence P. Hobbes

[57] ABSTRACT

Pillared layered silicate compositions containing pillars of silica and metal oxides, e.g., alumina are prepared by contacting organic-swelled layered silicates, e.g. kenyaite-type materials, with a hydrolyzable silica precursor, e.g., tetraethylorthosilicate which forms silanol groups between the layers and contacting the resulting product with an aqueous solution containing inorganic metal salt and effecting hydrolysis of the silanol groups.

20 Claims, No Drawings

PILLARED LAYERED SILICATE COMPOSITIONS CONTAINING PILLARS OF SILICA AND METAL OXIDE AND THEIR PREPARATION

This is a continuation of copending application Ser. No. 195,057, filed on May 17, 1988 now abandoned, which is a continuation-in-part of U.S. application Ser. No. 939,265 filed Dec. 9, 1986, which is a continuation of U.S. application Ser. No. 797,276, filed Nov. 12, 1985, now abandoned, the contents of which are incorporated herein by reference.

The present invention relates to a method for preparing metal-modified layered silicate compositions which contain pillars comprising silica and metal oxide. Organic-swelled layered phases are intercalated with a silica pillar precursor, e.g., tetraethylorthosilicate (TEOS). Silanol groups in the pillar are then condensed with an aqueous metal or metalloid salt solution to provide the metal-modified layered silicate compositions which can be used as catalysts, e.g. in hydrocarbon conversion processes.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area, in particular, the interlamellar spacing can be increased substantially by absorption of various swelling agents such as water, ethylene glycol, amines, ketones, etc., which enters the interlamellar space and push the layers apart. However, the interlamellar spaces of such layered materials tend to collapse when the molecules occupying the space are removed, for example, by exposing the clays to high temperatures. Accordingly, such layered materials having enhanced surface area are not suited for use in chemical processes involving even moderately severe conditions.

Layered metal chalcogenide materials enjoying thermal stability can be prepared by a method described in U.S. application Ser. No. 879,787, filed June 27, 1986, now U.S. Pat. No. 4,859,648, and incorporated herein by reference. The method comprises: treating a layered chalcogenide, e.g., oxide, of at least one element having an atomic number of 4, 5, 12 to 15, 20 to 33, 38 to 51, 56 to 83 and greater than 90, inclusive, which contains ion exchange sites having interspathic cations associated therewith, with an organic compound which is a cationic species, e.g., n-alkylammonium or capable of forming a cationic species, e.g., n-alkylamine, to effect exchange with said interspathic cations in order to swell the layered material. An electrically neutral compound capable of conversion to an interspathic polymeric chalcogenide, e.g., tetraethylorthosilicate, is thereafter provided between the layers of the swelled, layered chalcogenide. The compound is then converted to the interspathic polymeric chalcogenide to form the layered material.

In the past, catalystically active pillars have been incorporated into smectite clays by direct intercalation of a catalytically active pillar in one step as is disclosed by T. J. Pinnavaia in *Science*, 1983, 220, 365-371. Another method of intercalation involves first ion-exchanging a catalytically active ion into the inner layer and then forming a pillar around said ion as is disclosed by Carrado et al. in *Inorg. Chem.*, 1986, 25, 4217-4221. U.S. Pat. No. 4,629,713 to Suzuki et al. discloses a method for treating clays which uses a sequential addition of reagents such that the catalytically active species is added to the reaction mixture last. Aluminum is added immediately after addition of the silica source, forming an interlayer gel which forms a pillar on calcination. U.S. patent application Ser. No. 879,787, now U.S. Pat. No. 4,859,648, teaches a method for preparing layered materials containing silica-alumina pillars by introducing a hydrolyzable aluminum compound, e.g., aluminum isoproxide, into an organic-propped layered material before, after, or simultaneously with the contacting of the layered material with a silica pillar precursor material, e.g., tetraethylorthosilicate. Such procedures require incorporation of organophilic, hydrolyzable metal compounds, hydrolysis of which is difficult to control.

The present invention relates to a method for preparing pillared layered silicate compositions which contain pillars comprising silica and metal oxide by contacting an organo-swollen layered silicate material with a hydrolyzable silica pillar precursor material which forms silanol groups. The resulting material is contacted with an aqueous solution containing a hydrated metal salt and hydrolysis of the silanol groups is then effected. The aqueous solution containing hydrated metal salt is believed to facilitate hydrolysis of the silanol groups, insofar as $H_2O$ liquids of the hydrolyzed metal salts are available for use in hydrolysis of the silanol groups. The hydrolysis provides pillars comprising silica and metal oxide disposed between the layers of the layered silicate material.

For present purposes, the term "metal" as used in the above paragraph can be said to include metalloids such as boron, phosphorus and arsenic.

The present invention is particularly useful in treating layered oxides which are "non-swellable." Such materials are distinguished from conventional clays which contain octahedrally coordinated metal oxide sheets bonded to tetrahedrally coordinated silica sheets and which undergo substantial swelling, sometimes by an essentially unbounded amount, when contacted with water. As used herein in relation to a layered oxide material, the term "non-swellable" is defined as meaning a layered oxide material, which, when contacted with at least 10 grams of water per gram of the layered oxide at 23° C. for 24 hours, exhibits an increase in X-ray diffraction pattern low angle two theta d-spacing no greater than 5 angstroms as compared with the material before treatment. Included among these materials are certain layered silicates, for example the metasilicates. Layered silicates, e.g., high silica alkali silicates such as magadiite, natrosilite, kenyaite, makatite, nekoite, kanemite, okenite, dehayelite, macdonaldite and rhodesite, unlike swellable clays, lack octahedral sheets, i.e., sheets composed of atoms which are octahedrally coordinated with oxygen atoms. Such high silica alkali silicates may be utilized as starting materials in the present invention as well as synthetic analogues thereof. Without stable intercalated pillars, these materials tend to have collapsed layers at elevated temperatures, low porosity and low surface area. The layered silicate starting materials used in the present invention contain ion exchange sites having interspathic cations associated therewith, i.e., cations disposed between the layers.

The layered silicates treated by the present invention known as high silica alkali silicates whose layers lack octahedral sheets can be prepared hydrothermally from an aqueous reaction mixture containing silica and caustic at relatively moderate temperatures and pressures. These layered silicates may contain tetracoordinate framework atoms other than Si. Such layered silicates can be prepared by co-crystallizing in the presence of non-silicon elements, e.g. those selected from the group consisting of Al, B, Cr, Fe, Ga, In, Ti, V, and Zr, as well as any other elements which are catalytically useful when incorporated in the silicate structure. Alternatively, non-silicon framework elements already in a layered silicate may be substituted by such an element. For example, kenyaite containing boron in its framework when treated with aluminum nitrate results in a kenyaite which contains aluminum in its framework. Both co-crystallized and substituted layered high silica alkali silicates may be treated by the present invention to provide layered materials containing interspathic polymeric silica and metal oxide pillars.

The method of the present invention can also be applied to synthetic magadiite-type materials which contain interspathic polymeric oxides. Synthetic magadiite, known as MCM-24, is readily synthesized hydrothermally from a reaction mixture containing inexpensive sources of silica and caustic. Tetracoordinate elements other than silicon, e.g., those selected from the group consisting of Al, B, Cr, Fe, Ga, In, Ni, Zr and other catalytically useful metals, may be added to the reaction mixture to produce synthetic magadiite-type layered silicates. Preferably, such elements are selected from the group consisting of Al and Fe. An organic directing agent may also be added to the reaction mixture. The reaction mixture for synthetic magadiite-type materials can be described in molar ratios as follows:

| | |
|---|---|
| $SiO_2/X_2O_3$ | = 10 to infinity where X can be Al, B, Cr, Fe, Ca, and/or Ni or other catalytically useful metal |
| $M^+OH^-/SiO_2$ | = 0 to 0.6, (preferably 0.1–0.6) M = any alkali metal |
| $H_2O/SiO_2$ | = 8–500 |
| $R/SiO_2$ | = 0–0.4 | where R can be an organic such as benzyltriethylammonium chloride, benzyltriemethyl-ammonium chloride, dibenzyldimethylammonium chloride, N,N'-dimethylpiperazine, triethylamine, or other quaternary compounds or heterocyclic amines.

The reaction mixture can be maintained at a temperature of about 100° to 200° C. for anywhere from about 1 to 150 days in order to form a product having the following composition:

| | |
|---|---|
| % N | = 0–3, e.g., 0 to 0.3 |
| $SiO_2/X_2O_3$ | = 10 to infinity where X may be in the tetrahedral or octahedral position |
| $M_2O/SiO_2$ | = 0 to 0.5, e.g., 0.5–0.1 |

The synthetic layered silicate materials thus prepared are of low surface area. Introduction of interspathic pillars according to the method of the present invention can increase the surface area of these materials. Generally, the synthetic magadiite-type material is acidified by any suitable means, e.g., treatment with aqueous 0.1N HCl, and thereafter treated with a "propping" or swelling agent.

The method of the present invention may also be used in preparing synthetic kenyaite-type materials which contain interspathic polymeric silica and metal oxide pillars. Kenyaite, a layered silicic acid which is known to exist in nature as a sodium salt $Na_2Si_{22}O_{45}H_2O$ can be prepared in the potassium form $K_2Si_{22}O_{45}10H_2O$ in the laboratory. Synthetic kenyaite is readily synthesized hydrothermally from a reaction mixture containing inexpensive sources of silica and caustic, preferably KOH. Tetracoordinate elements other than silicon, e.g., those selected from the group consisting of Al, B, Cr, Fe, Ga, In, Ni, Zr and other catalytically useful metals, may be added to the reaction mixture to produce synthetic kenyaite-type layered silicates. $Al(NO_3)_3 \cdot 9H_2O$ and aluminum-tri-sec-butoxide are suitable reagents for the introduction of non-silicon tetracoordinate elements in the kenyaite framework. Co-crystallizing with B, Al, Ga, Fe and/or Zr is particularly preferred. The reaction mixture may also be seeded with kenyaite. The resulting layered silicates can then be treated in accordance with the present invention.

The present invention is also suited for treating kenyaite-type materials such as MCM-20, whose preparation is disclosed in the patent application U.S. Ser. No. 939,265 filed Dec. 9, 1986, now U.S. Pat. No. 4,791,088.

The organic swelling agent used in swelling the layered silicate starting materials of the present invention can comprise a source of organic cation such as organoammonium, which source may include the cation itself, in order to effect an exchange of the interspathic cations resulting in the layers of the starting material being propped apart. In particular, protonated alkylamines are preferred. Often, alkylammonium cations include n-dodecylammonium, n-octylammonium, n-heptylammonium, n-hexylammonium and n-propylammonium. The source of organic cation in those instances where the interspathic cations include hydrogen or hydronium ions may include a neutral compound such as organic amine which is converted to a cationic analogue during the swelling or "propping" treatment. Among these materials are $C_3$ to $C_{20}$, preferably $C_6$ to $C_8$ alkylamines, preferably n-alkylamines, or $C_3$ to $C_{10}$, preferably $C_6$ to $C_8$ alkanols, preferably n-alkanols, or $C_6$–$C_{20}$, preferably $C_{16}$, quaternary ammonium ions, e.g., cetyldimethylethylammonium chloride or cetyltrimethylammonium bromide.

The silica pillars of the present invention are formed from a precursor material which is preferably introduced between the layers of the organic swollen species as a cationic, or more preferably, electrically neutral, hydrolyzable compound of silicon. The precursor material is preferably an organosilicate compound which is a liquid under ambient conditions. In particular, hydrolyzable silicon compounds, e.g., alkoxides, are utilized as the precursors. Suitable polymeric silica precursor materials include tetraalkylsilicates, e.g., tetrapropylorthosilicate, tetramethylorthosilicate and, most preferably, tetraethylorthosilicate (TEOS).

After incorporation of the silica precursor material, the resulting layered material can be filtered and dried. The silica precursor treated material which contains silanol groups is contacted with an aqueous solution containing inorganic metal salt and hydrolysis of the silanol groups is effected thereby. Preferably, the layered material is filtered and dried, e.g., in air. The material can then be calcined at temperatures of about 500° to 600° C., preferably about 520° to 560° C., say 540° C., for at least 3 hours, to form a thermally stable product.

The metal salt used is inorganic and contains a metal selected from Groups IIIA, IVA, VA, VIA, VIIA, VIIIA, IB, IIB, IIIB, IVB and VB of the Periodic Table of the Elements (Fisher Scientific Co. Cat. No. 5-702-10, 1978). Preferably these salts comprise an anion selected from the group consisting of $NO_3^-$, $CO_3^=$, $SO_4^=$, $Cl^-$, $Br^-$, $ClO_4^-$, and $F^-$. More particularly, the salt can be selected from the group consisting of $Al(NO_3)_3$, $Ga(NO_3)_3$, $Cr(NO_3)_3$, $Co(NO_3)_2$, $Fe(NO_3)_3$, and $La(NO_3)_3$. Halide salts including chlorides, for example, $SnCl_4$, $AlCl_3$, $TiCl_4$, $TiCl_3$ may also be used. The concentrations of said salts in the aqueous solution can range from about 0.001 to 1.0M, preferably from about 0.01 to 1.0M, say about 0.1 to 0.5M.

The present invention is illustrated further by the following examples. In these examples, adsorption data were determined as follows: A weighed sample was contacted with the desired pure adsorbate vapor at a pressure less than the vapor-liquid equilibrium pressure of the adsorbate at room temperature. Adsorption was complete when a constant pressure in the adsorption chamber was reached (overnight for water, 3 hours for hydrocarbons); e.g., 12 mm of mercury for water and 40 mm for n-hexane and cyclohexane. Samples were then weighed. The increase in weight was calculated as the adsorption capacity of the samples. Nitrogen BET surface areas were reported in $m^2/g$. X-ray diffraction data were obtained by standard techniques using K-alpha doublet of copper radiation.

When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an alpha of 1 (Rate Constant=0.16 sec$^{-1}$). The alpha test is described in U.S. Pat. No. 3,354,078 and in *The Journal of Catalysis*, Vol. IV. pp. 522-529 (August 1965).

EXAMPLE 1
PREPARATION OF MCM-20, A KENYAITE-TYPE LAYERED MATERIAL

Aluminum nitrate, $Al(NO_3)_3 \cdot 9H_2O$, 1.6 g. was dissolved in 80 g $H_2O$. A solution of 21.1 g of Dabco-$C_5$-diquat dibromide in 100 g of water was added, followed by a solution of 7.8 g of potassium hydroxide (87.2% KOH) in 50 g of water. Finally, 48 g of Hi-Sil (87% $SiO_2$) available from PPG Industries was blended into the composite solution. The mixture was digested in a stirred autoclave at 160° C. for about three days. The final pH was 12.29. The crystalline product was filtered, washed with water until bromide-free and then dried at ambient temperature.

The product was analyzed to contain:

| | |
|---|---|
| 8.6% | carbon |
| 2.27% | nitrogen |
| 0.85% | $Al_2O_3$ |
| 70% | Ash |

The balance is mainly $SiO_2$ and some K

The air calcined sample (1000° F., 3 hours) had a surface area of 132 m/g and sorptive properties of 4.2% $H_2O$, 2.3% cyclohexane and 2.4% n-hexane.

Ten grams of the MCM-20 material in its "as synthesized" form was added to 100 ml of water. Dilute HCl solution (0.1N) was added to get a pH of 2 and the reaction mixture was maintained at this pH by the addition of HCl. After about 24 hours, the mixture was filtered, water-washed and dried. The dry solid was added to a mixture of 20 g. dimethylsulfoxide and 10 g n-octylamine at ambient temperature for 24 hours. The solid gave an x-ray diffraction pattern whose main low angle peak is at 3.5° (2 theta). The solid was then treated with 30 grams of tetraethylorthosilicate (TEOS) at ambient temperature for about 21 hours. The solid was finally filtered and dried. The dried product had a low-angle line at 3.2° C. two theta. The (TEOS) treated but uncalcined sample was contacted with 0.1N $Al(NO_3)_3$ solution at 212° F. for 4 hours. The exchanged sample was then filtered, washed and calcined in air at 1000° F. for 3 hours. The sample has an alpha value of 2 under standard test conditions. Re-exchange of the calcined sample with 0.1N $Al(NO_3)_3$ and re-calcination yielded a product having an alpha value of 3.

EXAMPLE 2
PREPARATION OF SYNTHETIC KENYAITE

The following were mixed together, in order:
13,000 g Deionized $H_2O$
2925 g Ultrasil ($SiO_2$ from PQ Corp.)

The slurry was added to an autoclave and crystallized at 300° F. at autogenous pressures while being stirred at 90 rpm for 3 days. After crystallization, the material was filtered, washed with water, and dried at 450° F.

A sample of the kenyaite (1000 g) was added to 5 liters of water. Dilute (1M)HCl was added until the final pH was 2.0, maintained and stirred at this pH for 24 hours. Afterwards, the mixture was filtered, water-washed and dried. Some of the solid (1000 g) were added to 5 liters of water, to which 1000 g of octylamine were added, then stirred overnight, about 18 hours. Half of this material was suspended in 6 liters of water to which 115 g of 2% Hercofloc ® 834, a cationic polymer available from Hercules were added to ease the filtration of the swollen material as described in U.S. Pat. No. 4,728,439, incorporated herein by reference. The resulting material was stirred, filtered and washed.

EXAMPLE 3

SYNTHETIC KENYAITE CONTAINING PILLARS OF SILICON AND ALUMINUM OXIDES (MCM-25(Si, Al))

Silica/alumina pillard [Si]kenyaite was prepared by suspending 20 g of the octylamine swollen acid-exchanged kenyaite of Example 2 in 100 g TEOS. The slurry was stirred overnight (about 18 hours) in a closed polypropylene jar, then filtered and air-dried. The dry solid was suspended in 100 ml of 0.5M Al(NO$_3$)$_3$ and stirred for 2 hours. This solid was filtered, air-dried to a dry powder, then calcined in air at 540° C. for 6 hours. The composition and physical properties of the product are given in Tables 1 and 2 respectively. The adsorption analysis was typical of a molecular sieve. The capacities are:

| | | | |
|---|---|---|---|
| H$_2$O | 20.1% | P(Torr) | = 12/H$_2$O |
| Cyclohexane | 9.4% | P(Torr) | = 40/CYC6 |
| N-Hexane | 9.2% | P(Torr) | = 40/N—C$_6$ |

EXAMPLE 4

SYNTHETIC KENYAITE CONTAINING PILLARS OF SILICON AND GALLIUM OXIDES (MCM-25(Si, Ga))

As-synthesized kenyaite was added to a five-fold excess aqueous solution of 25 weight % solution cetyltrimethylammonium chloride. The material was stirred overnight, about 18 hours, filtered and washed with H$_2$O until the supernate was chlorine free. The air-dried swollen kenyaite was impregnated with TEOS (1 g. TEOS/g solid), mixed overnight in a sealed polypropylene jar, then air-dried.

Silica/gallia pillared [Si]kenyaite was prepared by suspending 10 g of the air dried product in 120 g 0.1M Ga(NO$_3$)$_3$. The slurry was stirred for 2 hours then filtered, air dried, and calcined for 6 hours at 540° C. The physical properties of the product are given in Table 2.

EXAMPLE 5

SYNTHETIC KENYAITE CONTAINING PILLARS OF SILICON AND CHROMIUM OXIDES (MCM-25(Si, Cr))

Silica/chromia pillared [Si]kenyaite was prepared in an analogous manner to that described in Example 4 above except the silicate was suspended in 120 g of 0.5M Cr(NO$_3$)$_3$. The composition and physical properties of the product are given in Tables 1 and 2, respectively.

EXAMPLE 6

SYNTHETIC KENYAITE CONTAINING PILLARS OF SILICON AND COBALT OXIDES (MCM-25(Si, Co))

Silica/cobalt-oxide pillard [Si]kenyaite was prepared in an analogous manner to that described in Example 4 above except the silicate was suspended in 120 g of 0.5M Co(NO$_3$)$_2$. The composition and physical properties of the product are given in Tables 1 and 2, respectively.

EXAMPLE 7

SYNTHETIC KENYAITE CONTAINING PILLARS OF SILICON AND IRON OXIDES (MCM-25(Si, Fe))

Silica/iron-oxide pillared [Si]kenyaite was prepared in an analogous manner to that described in Example 4 above except the silicate was suspended in 120 g of 0.5M Fe(NO$_3$)$_3$. The composition and physical properties of the product are given in Tables 1 and 2, respectively.

EXAMPLE 8

SYNTHETIC KENYAITE CONTAINING PILLARS OF SILICON AND TIN OXIDES (MCM-25(sin, Sn))

Silica/tin-oxide pillared [Si]kenyaite was prepared in an analogous manner to that described in Example 4 above except the silicate was suspended in 120 g of 0.5M SnCl$_4$ and the slurry was stirred overnight, for about 18 hours. The composition and physical properties of the product are given in Tables 1 and 2, respectively.

EXAMPLE 9

SYNTHETIC KENYAITE CONTAINING PILLARS OF SILICON AND ALUMINUM OXIDES (MCM-25(Si, Al))

Silica/alumina-pillared [Si]kenyaite was prepared in an analogous manner to that described in Example 8 except the silicate was suspended in 100 g 0.5M Al(NO$_3$)$_3$. The composition and physical properties of the product are given in Tables 1 and 2, respectively.

EXAMPLE 10

SYNTHETIC KENYAITE CONTAINING PILLARS OF SILICON AND ALUMINUM OXIDES (MCM-25-Ga(Si, Al))

Ga(NO$_3$)$_3$ (8.5 g) was sissolved in 100 g H$_2$O and added to Ludox LS colloidal silica (200g). To this silica solution, KOH (20 g, pellets 85%) dissolved in 100 g H$_2$O was added. The gel was aged at ambient temperatures for about 1 hour and then in a steambox for another hour. The gel was then dispersed in 100 ml H$_2$O. The reaction mixture was crystallized at 150° C. for 120 hours under autogenous pressure in a stirred 600 ml autoclave. The product was filtered, washed with H$_2$O, air-dried. The composition, basal spacing, and surface area of the silicate product are:

| | |
|---|---|
| SiO$_2$, wt. % | 79.0 |
| Al$_2$O$_3$, ppm | 1180 |
| K, wt. % | 5.5 |
| Ga, wt. % | 1.1 |
| Ash @ 1000° C., wt. % | 90.53 |
| Basal spacing, A | 18.4 |
| Surface Area, m$^2$/g | 10 |

The MCM-25 Ga (43 g) was suspended in 500 mls cetyldimethylethylammonium bromide, CH$_3$(CH$_2$)$_{15}$N(CH$_3$)$_2$(C$_2$H$_5$)Br, stirred for 6 hours at 80° C., filtered, washed with H$_2$O, then air-dried. The air-dried powder was impregnated with TEOS, 1 g TEOS/g solid, mixed in a sealed polypropylene jar, then air-dried. Some of this power (10 g) was suspended in 100 mls 0.5M AL(NO$_3$)$_3$, and stirred overnight, about 18 hours.

The product was filtered, air-dried, and calcined in air at 540° C. for 6 hours. The composition, and physical properties of the product are given in Tables 1 and 2, respectively.

TABLE 1

Elemental Compositions of Si/M-pillared [Si]kenyaites

| Example | | SiO$_2$ (wt %) | Al$_2$O$_3$ (ppm) | M (wt %) | K (ppm) | Ash @ 1000° C. (wt %) |
|---|---|---|---|---|---|---|
| 3 | (M = Al) | 87.7 | — | 2.9 | 365 | 94.36 |
| 4 | (M = Ga) | 89.7 | 1030 | 1.1 | 300 | 92.72 |
| 5 | (M = Cr) | 89.7 | 805 | 2.9 | ≦5 | 91.8 |
| 6 | (M = Co) | 91.6 | 1110 | 5.0 | 440 | 93.68 |
| 7 | (M = Fe) | 90.6 | 1150 | 3.2 | 400 | 92.98 |
| 8 | (M = Sn) | 77.7 | 845 | 1.10 | 220 | 95.62 |
| 9 | (M = Al) | 83.2 | — | 6.6 | 285 | 91.31 |
| 10 | (M = Al, M' = Ga 2.1%) | 82.5 | — | 6.0 | 0.90% | 92.62 |

TABLE 2

Physical Properties of Si/M-pillared [M']kenyaites

| Example | Basal spacing (A) | Surface Area (m$^2$/g) | Alpha |
|---|---|---|---|
| 3 | 27.6 | 348 | 5 |
| 4 | 31.5 | 718 | 8 |
| 5 | 36.8 | 679 | 17 |
| 6 | 34.0 | 600 | 4 |
| 7 | 36.8 | 586 | 2 |
| 8 | 34.0 | 555 | 1 |
| 9 | 28.5 | 542 | 5 |
| 10 | 34 | 259 | 4 |

What is claimed is:

1. A method for preparing pillared layered silicate compositions which contain pillars comprising silica and metal oxide which comprises contacting an organic-swollen layered silicate material with a hydrolyzable silica pillar precursor material which forms silanol groups and contacting the resulting material with an aqueous solution containing an inorganic metal salt and effecting hydrolysis of said silanol groups thereby providing pillars comprising silica and metal oxide disposed between the layers of said layered silicate material.

2. The method of claim 1 wherein said metal salt contains a metal selected from groups IIIA, IVA, VA VIA, VIIA, VIIIA, IB, IIB, IIIB, IVB and VB of the Periodic Table.

3. The method of claim 1 wherein said metal salt comprises an anion selected from the group consisting of NO$_3$$^-$, CO$_3$$^=$, SO$_4$$^=$, Cl$^-$, ClO$_4$$^-$, Br$^-$, and F$^-$.

4. The method of claim 3 wherein said salt is selected from the group consisting of Al(NO$_3$)$_3$, Ga(NO$_3$)$_3$, Cr(NO$_3$)$_3$, Co(NO$_3$)$_2$, Fe(NO$_3$)$_3$, and La(NO$_3$)$_3$.

5. The method of claim 3 wherein said salt is selected from the group consisting of SnCl$_4$, TiCl$_3$, AlCl$_3$ and TiCl$_4$.

6. The method of claim 1 wherein said hydrolyzable silica pillar precursor is tetraalkylorthosilicate.

7. The method of claim 6 wherein said hydrolyzable silica pillar precursor is tetraethylorthosilicate.

8. The method of claim 7 wherein said salt is Al(NO$_3$)$_3$.

9. The method of claim 1 wherein said layered silicate material is non-swellable.

10. The method of claim 1 wherein said layered silicate material is selected from the group consisting of magadiite, natrosilite, kenyaite, makatite, nekoite, kanemite, okenite, dehayelite, macdonaldite and rhodesite.

11. The method of claim 1 wherein said layered silicate material is magadiite.

12. The method of claim 1 wherein said layered silica material is synthetic magadiite (MCM-24).

13. The method of claim 10 wherein said layered silicate material is kenyaite.

14. The method of claim 1 wherein said layered silicate material is synthetic kenyaite (MCM-25).

15. The method of claim 1 wherein said layered silicate material is MCM-20.

16. The method of claim 1 wherein said layered silicate contains non-silicon framework atoms.

17. The method of claim 16 wherein said non-silicon framework atoms are selected from the group consisting of Al, B, Cr, Fe, Ga, Ni and Zr.

18. The method of claim 16 wherein said non-silicon framework atoms are B.

19. The method of claim 16 wherein said non-silicon framework atoms are Ga.

20. The method of claim 1 wherein said aqueous solution contains about 0.1 to 0.5 moles of said salt per liter.

* * * * *